(12) United States Patent
Koshti et al.

(10) Patent No.: US 9,382,452 B2
(45) Date of Patent: Jul. 5, 2016

(54) LOW SURFACE ENERGY BONDING ADHESIVE FORMULATION AND PROCESS FOR THE USE THEREOF

(71) Applicant: Illinois Tool Works, Inc., Glenview, IL (US)

(72) Inventors: Prashant Koshti, Secunderabad (IN); Brajesh Shukla, Hyderabad (IN); Subodh Deshpande, Secunderabad (IN); Dan Doe, Hyde Park, MA (US); Peter Carbutt, Groton, MA (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 14/103,822

(22) Filed: Dec. 11, 2013

(65) Prior Publication Data

US 2014/0216656 A1     Aug. 7, 2014

Related U.S. Application Data

(60) Provisional application No. 61/762,151, filed on Feb. 7, 2013.

(51) Int. Cl.
| | |
|---|---|
| *B05D 5/10* | (2006.01) |
| *C09J 7/02* | (2006.01) |
| *C08K 5/17* | (2006.01) |
| *C08K 5/55* | (2006.01) |
| *C09J 4/06* | (2006.01) |
| *C08F 220/18* | (2006.01) |
| *C08F 222/10* | (2006.01) |
| *C08L 23/14* | (2006.01) |

(52) U.S. Cl.
CPC ... *C09J 7/02* (2013.01); *B05D 5/10* (2013.01); *C08K 5/17* (2013.01); *C08K 5/55* (2013.01); *C09J 4/06* (2013.01); *C08F 220/18* (2013.01); *C08F 222/1006* (2013.01); *C08L 23/14* (2013.01)

(58) Field of Classification Search
CPC .............. C08K 5/17; C08K 5/55; B05D 5/10
See application file for complete search history.

(56) References Cited

U.S. PATENT DOCUMENTS

| | | | |
|---|---|---|---|
| 3,236,823 A | 2/1966 | Leverkusen et al. | |
| 3,275,611 A | 9/1966 | Mottus et al. | |
| 3,527,737 A | 9/1970 | Masuhara et al. | |
| 4,385,153 A | 5/1983 | Ritter | |
| 4,515,724 A | 5/1985 | Ritter | |
| 4,676,858 A | 6/1987 | Ritter | |
| 4,705,838 A | 11/1987 | Goel | |
| 4,920,188 A | 4/1990 | Sakashita et al. | |
| 4,985,516 A | 1/1991 | Sakashita et al. | |
| 5,106,928 A | 4/1992 | Skoultchi et al. | |
| 5,286,821 A | 2/1994 | Skoultchi | |
| 5,376,746 A | 12/1994 | Skoultchi | |
| 5,616,796 A | 4/1997 | Pocius et al. | |
| 5,935,711 A | 8/1999 | Pocius et al. | |
| 6,706,831 B2 | 3/2004 | Sonnenschein et al. | |
| 7,014,975 B2 | 3/2006 | Barthel et al. | |
| 7,408,012 B1 | 8/2008 | Kneafsey et al. | |
| 7,683,132 B2 | 3/2010 | Jialanella et al. | |
| 2007/0079931 A1* | 4/2007 | Feng et al. | 156/331.1 |

FOREIGN PATENT DOCUMENTS

| | | |
|---|---|---|
| GB | 2491170 A | 11/2012 |
| WO | 9817694 A1 | 4/1998 |
| WO | 2008045921 A2 | 4/2008 |

OTHER PUBLICATIONS

Frank Bauer, Horst Ernst, Dietmar Hirsch, Matthias Pelzing, Volker Sauerland, and Reiner Mehnert, Surface Modification of Oxide Nanoparticles for Polyacrylate Reinforcement.

* cited by examiner

*Primary Examiner* — Peter D Mulcahy
(74) *Attorney, Agent, or Firm* — Avery N. Goldstein; Blue Filament Law

(57) ABSTRACT

An adhesive two-part formulation is provided that includes an amount of free-radical curable monomers, each of said monomers containing at least one acrylate moiety. Also preset in the formulation is an amount of a chlorosulfonated polymer; a Lewis acid; a polyfunctional monomer amount of dimethacrylate monomer, trimethacrylate monomer, an elastomer, a thermoplastic additive, or a combination thereof. A borane-amine complex is provided as an activator. A process of applying the formulation to a substrate includes mixing together the formulation components such that each part has a storage stability at 50° C. for 30 days where the viscosity at 30 days is within 40% of an initial viscosity. The mixture is applied to the substrate and then allowed to cure to achieve an initial strength of at least 345 kiloPascals (kPa) within 30 minutes and 40 minutes for adhesive:activator weight ratio of 1:1 and 10:1, respectively.

20 Claims, No Drawings

LOW SURFACE ENERGY BONDING ADHESIVE FORMULATION AND PROCESS FOR THE USE THEREOF

CROSS-REFERENCE TO RELATED APPLICATIONS

This application claims priority of U.S. Provisional Patent Application Ser. No. 61/762,151 filed Feb. 7, 2013, which is incorporated herein by reference.

FIELD OF THE INVENTION

The present invention in general relates to adhesives, and in particular to free radical curing adhesives able to adhere to low surface energy substrates with a rapid build of adhesive strength.

BACKGROUND OF THE INVENTION

Adhesive formulations capable of bonding to low energy surfaces such as polyolefins are now commonplace. The ability to adhesively bond to a surface with a limited number of available bonding sites and characterized by a surface energy value of less than approximately 48 miliJoules per meter squared ($mJ/m^2$) has been addressed in the past through surface activation of the low energy surface through various treatments such as exposure to flame, plasma, ion bombardment, or other processes to create reactive moieties to which an adhesive could bond. While such low energy surface modification treatments proved effective, they have met with limited acceptance owing to the cost, limited duration of surface activation, and the impracticality of surface treatment in field usage or to bond large area substrates.

Resort to primer compositions intermediate between a low energy surface and an adhesive were found to address in part the limitations of high energy surface treatments, yet such primers add to the cost and complexity of bonding thereby limiting instances of practical usage. Additionally, the strength of low energy surfaces adhesively bonded through resort to primers has compromised strength owing to interfacial delamination.

In response to these limitations, adhesive formulations have been developed that rely on organoboranes as free radical polymerization initiators to induce cure of an adhesive formulation and simultaneously promote adhesive bonding to a contacting substrate. Exemplary of such compositions are those detailed in U.S. Pat. Nos. 5,106,928; 6,706,831; and 5,935,711. Organoborane amine complexes overcame many of the stability issues associated with organoboranes and represent the state-of-the art in adhesive bonding to low energy surfaces. Unfortunately, while organoborane amine complex formulations overcome many of the aforementioned problems of energy surface treatments, primers, and unstable organoboranes, persistent limitations of these formulations have led to limited market acceptance. Existing adhesive formulations are two-part formulations that require a mix weight ratio of adhesive Part A to activator Part B of 4:1 ratio, which represents an inconvenient mix ratio for many applications. Additionally, conventional organoborane amine complex formulations have a slower than desired cure rate with adhesive strength developing slowly as evidenced by a single lap shear strength of 345 kilopascals (kPa) taking approximately two hours to develop, as measured by ASTM D 1002 at standard temperature and pressure (STP). Additionally these conventional formulations suffer from poor storage thermal stability at elevated temperatures of above 40° C. that are often experienced by adhesive formulations prior to usage.

Thus, there exists a need for a low surface energy bonding adhesive formulation able to develop initial strength more quickly than conventional formulations, and to do so without resort to prior low surface energy substrate treatment. There also exists a need for such a formulation that has superior thermal stability to promote formulation storage prior to usage.

SUMMARY OF THE INVENTION

An adhesive formulation is provided that includes an amount of free-radical curable monomers, each of said monomers containing at least one acrylate moiety or at least one methacrylate moiety. An amount of a chlorosulfonated polymer, low molecular weight sulfonyl chlorides, or elastomeric polymer additive or a combination thereof is present in the formulation along with a Lewis acid, a polyfunctional monomer amount of dimethacrylate monomer, trimethacrylate monomer, or a combination thereof. A organoborane-amine complex is provided as an activator.

A process of applying an adhesive to a substrate includes mixing together the components of an aforementioned two-part formulation wherein each of the two parts has storage stability at 50° C. for 21 days and in some instances 30 days or more such that viscosity at storage is within 20% of an initial viscosity. The mixture is applied to the substrate and then allowed to cure to achieve an initial strength of at least 345 kilopascals (kPa) within 30 minutes and 40 minutes for adhesive: activator weight ratios of 1:1 and 10:1, respectively.

DETAILED DESCRIPTION OF THE INVENTION

The present invention has utility as a curing adhesive particularly well-suited for bonding to low surface energy substrates such as polyolefins. Polyolefins are synonymously referred to herein as thermal plastic polyolefins (TPOs). The TPOs operative herein that illustratively include polyethylene, polypropylene, polybutene, polyisoprene and copolymers containing subunits thereof, fluorinated analogs thereof, and copolymers containing subunits of any of the aforementioned olefins. Other low surface energy substrate that are adhered by an inventive formulation illustratively include grit blasted mild steel (GBMS), E-coated steel, glass, wood, acrylonitrile-butadiene-styrene (ABS), Nylon 6, Nylon 66, CFRP and polycarbonate (PC) and closed molded composites. An inventive formulation is particularly useful for bonding low surface energy substrates to one another, as well as to other as to other substrates including metals, and other plastics so as to build strength quickly during cure to facilitate handling and substrate disengagement with fixturing devices in a manufacturing setting.

An inventive formulation provided as a two-part formulation includes an adhesive part that is synonymously referred to as Part A or an adhesive Part A. The adhesive part of inventive formulation as a two-part formulation in prototypical form includes all the components active in the polymerization reaction except that an organoborane compound activator the formulation present is predominantly in an activator part that is synonymously referred to as Part B or an activator Part B. The following components of an inventive formulation are detailed as weight percentages of a formulated Part A or Part B inclusive of all components except diluents that are non-reactive under free radical cure conditions.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

An adhesive Part A includes in an adhesive in certain inventive embodiments has a majority by active weight percent of acrylate monomer, methacrylate monomer, or a combination thereof. In other embodiments of the present invention, such monomers represent at least 20 weight percent of an adhesive Part A (exclusive of non-reactive diluents). Acrylate monomers and methacrylate monomers operative in the present invention illustratively include methylmethacrylate, $C_1$-$C_{16}$ alkylacrylate, $C_1$-$C_{16}$ alkyl methacrylate, $C_1$-$C_{16}$ hydroxyl alkylacrylates, $C_1$-$C_{16}$ primer amine acrylates, $C_1$-$C_{16}$ secondary amine acrylates, $C_1$-$C_{16}$ acrylosulfonic acids, and epoxy $C_1$-$C_{16}$ acrylates or methacrylates. Specific acrylate and methacrylate monomers operative herein in addition to aforementioned methylmethacrylate include methylacrylate, ethylacrylate, ethylmethacrylate, isobornyl methacrylate, butylacrylate, octylacrylate, ethyl hexyl acrylates, ethyl hexyl methacrylates, dodecyl methacrylate, cyclic trimethyolpropane formal acrylate, tetrahydrofurfuryl methacrylate, cyclohexyl methacrylate, 2-hydroxyl ethylacrylate, 2-hydroxyl methacrylate, 3-hydroxyl propylacrylate, 1-hydroxyl-2 amino propyl methacrylate, 1-amino-2-hydroxyl propyl methacrylate, acrylamide, 1-amino-3-hydroxy propyl methacrylate, 2-terbutyl amino ethyl methacrylate, 2-acrylamido-2-methyl propane sulfonic acid, or glycidyl methacrylate.

An inventive formulation also includes in certain embodiments a di-methacrylate monomer, a tri-methacrylate monomer, or a combination thereof. These monomers are synonymously referred to herein as polyfunctional monomers and illustratively a di- or tri-(meth)acrylate monomers, such as those selected from polyethylene glycol di(meth)acrylates, bisphenol-A di(meth)acrylates, tetrahydrofurane di(meth)acrylates, hexanediol di(meth)acrylates, polythylene glycol di(meth)acrylates, such as triethylene glycol di(meth)acrylate, tripropylene glycol di(meth)acrylate, tetraethylene glycol di(meth)acrylate, diethylene glycol di(meth)acrylate, 1,4-butanediol di(meth)acrylate, 1,6-hexanediol di(meth) acrylate, pentaerythritol tetra(meth)acrylate, trimethylol propane tri(meth)acrylate, trimethylol propane tri(meth) acrylate, di-pentaerythritol monohydroxypenta(meth)acrylate, pentaerythritol tri(meth)acrylate, ethoxylated bisphenol-A di(meth)acrylate, ethoxylated trimethylolpropane tri (meth)acrylates, trimethylolpropane propoxylate tri(meth) acrylates, or combinations thereof; and other such monomers as detailed in U.S. Pat. No. 7,408,012; and U.S. Pat. No. 5,376,746. In those embodiments of the present invention containing polyfunctional monomers, the polyfunctional monomer is typically present on a mole ratio relative to the aforementioned acrylate monomers of 0.001-0.5:1 with the ratio modifying the average chain length between cross linkages.

In order to induce cure, a stabilized organoborane such as trialkyl boron-amine activator used in an inventive combination, a Lewis acid is present that acts as electronic acceptors under cure conditions. The nature of the Lewis acid operative herein is limited only by compatibility with other formulation components. Classes of Lewis acids operative herein that destabilize organoborane-amine complexes to liberate a free radical polymerization activator of an organoborane include mineral acids, organic acids, sulfonyl chlorides, trihalo-boranes, Grignard reagents, alkali metal ions, alkali earth ions, main group trivalent metal ions; and combinations thereof. In certain embodiments of the present invention, the Lewis acid is a chlorosulfonated polymer. Chlorosulfonated polymers operative herein illustratively include chlorosulfonated polyethylene. In still other embodiments, an inventive formulation uses a Lewis acid of a carboxylic acid, alone or in combination with a chlorosulfonated polymer, low molecular weight sulfonyl chloride, or a combination thereof. Carboxylic acids operative herein illustratively include maleic acid, acrylic acid, metha acrylic acid, crotonic acid, itaconic acid and combinations thereof. Without intending to be bound to a particular theory, it is believed that a carboxylic acid component is operative in an inventive formulation to enhance adhesion to a polyolefin substrate. The amount of Lewis acid present is appreciated to depend upon the relative activity and is selected to provide a storage stability to Parts A and B stored separately at 50° C. for more than 21 days and in still other embodiments for 30 days or more with a change in viscosity of either part of less than 40% and in some embodiments of even less than 20%.

In other embodiments, the open time and cure rate are modified through addition of an organosulfonyl halide operating in conjunction with a chlorosulfonated polymer as Lewis acids. Sulfonyl chlorides operative herein include compounds with mono- or dual sulfonyl chloride functionality such as $C_1$-$C_{12}$ alkylsulfonyl chlorides, $C_6$-$C_{24}$ arylsulfonyl chlorides, di-sulfonyl chlorides, tosyl chloride and 4,4'-bisoxybisbenzylether disulfonyl chloride.

In embodiments of the present invention in which toughening of the adhesive applied to a substrate is required, a grafted elastomer/thermoplastic additive is provided in an inventive formulation. In specific inventive embodiments, a grafted elastomer, if present, has a glass transition temperature of less than 100° C. In still other embodiments, a grafted elastomer in an inventive formulation has a glass transition temperature of less than −50° C. The selection of a grafted elastomer operative in an inventive formulation is limited only by the criteria of compatibility with other compounds of an inventive formulation, solubility in at least one of Part A or Part B of an inventive two-part formulation. It is appreciated that a grafted elastomer/thermoplastic additive can be used to improve impact strength and bond strength at low temperatures after cure to a substrate as well as improving the non-sag and thixotropic properties of an inventive formulation during cure. Grafted elastomers/thermoplastic additive operative herein illustratively include: homopolymers such as polybutadiene, polyisoprene and polyisobutylene; diene type copolymers such as butadiene/styrene copolymer, butadiene/acrylonitrile copolymer, butadiene/methyl methacrylate copolymer and butadiene/alkyl acrylate copolymer; ethylene/vinyl acetate copolymers; styrene/acrylonitrile copolymers, ethylene/alkyl acrylate copolymers, rubbery polyalkyl acrylates or copolymers thereof; polyurethane; chlorinated polyethylenes; EPDM (ethylene/propylene/diene terpolymers); and combinations thereof.

The above described acrylate monomers alone or in combination with polyfunctional acrylate monomers are cured to form an adhesive formulation able to bond to a low surface energy substrate through a free radical process initiated by a organoboranes such as trialkyl borane, alkyl cycloalkyl borane, or a combination thereof. Trialkyl boranes operative herein illustratively include triethyl borane, tri-isopropyl borane, and tri-n-butyl borane. Typical trialkyl boranes operative herein include between 6 and 20 alkyl carbons in total. In inventive formulations in which storage stability upon exposure to air is desired, an organo borane is provided in the form of an amine complex. The identity of the amine stabilizing an organo borane is limited only by compatibility with other formulation components and the ability to reversibly liberate the organo borane upon exposure to the Lewis acid component of an inventive formulation. Organo borane-amine complexes operative herein illustratively include triethyl borane, tri-isopropyl borane, tri-n butyl borane, pyridine-borane, lithium triethyl borohydride, lithium tri-sec-butylborohydride and combinations thereof.

In other embodiments of the present invention, an inventive formulation includes at least one of halogenated tallow alkyl amines, aziridine, polyaziridines, dihydrocarbyl hydroxyl amine, 2,2,6,6-tetra-methyl-piperidimyloxyl (TEMPO); 2,2,5,5-tetra-methyl-pyrolyloxy (PROXYL) or a combination thereof that operate synergistically to provide storage stability to an inventive formulation at 50° C. for 21 days and in other embodiments for 30 days or more such that viscosity does not increase by more than 20% of the initial viscosity, while also affording a rapid build in strength to greater than 345 kPa within 30 min for 1:1 and 40 min for 10:1 Part A: Part B weight ratio minutes as measured by ASTM D 1002.

An inventive formulation in certain embodiments also includes various oxidizing agents, reducing agents, thickeners, pigments, thixotropic agents, plasticizers, antioxidants, fillers, and combinations thereof. Such additives are limited only by the requirement of compatibility with the other components of an inventive formulation. Such additives are provided to balance or otherwise modify at least one property of an inventive formulation as to handling, storage, cure rate, or adhesive properties.

Fillers operative herein illustratively include silica particulate, fumed silica, alumina, diatomaceous earth, mica, clays, cellulosic particulate, glass fiber, hollow glass beads, synthetic polymeric microspheres, talc, ground plant, shells or husks, and combinations thereof. It is appreciated that a filler is readily derivatized to have a surface modified with polymerizable moieties such as the aforementioned acrylate monomers, as detailed for example in U.S. Pat. No. 7,014,975.

An inventive formulation in certain embodiments includes a diluent that is otherwise unreactive and serves to modify the volume of the formulation. A diluent is defined herein as a miscible and non-reactive compound relative to the components of the part in which the diluent resides. In particular, formulation diluents are, for example, inert fillers to adjust the weight ratios between a Part A and Part B that facilitate ease of mixing at the situs of formulation application to a substrate. It is appreciated that the industry finds weight ratios between Part A: Part B of 1:1 and 10:1 to be standard and thereby affording superior ease of use. Such diluents operative herein illustratively include 1,3-diamino propane and tetraglyme.

Formulation according to the present invention is a two-part adhesive as summarized below in Table 1. Two-part inventive formulation where amounts of ingredients are provided in weight percent and weight percent for each part.

TABLE 1

An Inventive 2-Part Formulation for Components in 1:1 and 10:1 wt ratio between Part A and Part B

| | Wt % | | | |
|---|---|---|---|---|
| | Typical | Specific | Typical | Specific |
| Part | Adhesive | Adhesive | Activator | Activator |
| Acrylate Monomer | 20.0-94.4 | 20.0-90.0 | 10.0-80.0 | 10.0-80.0 |
| Lewis acid | 0.5-20.0 | 0.5-20.0 | 0-5.0 | 0.001-5.0 |

TABLE 1-continued

An Inventive 2-Part Formulation for Components in 1:1 and 10:1 wt ratio between Part A and Part B

| | Wt % | | | |
|---|---|---|---|---|
| | Typical | Specific | Typical | Specific |
| Chlorosulfonated polymer | 0.0-60.0 | 0.001-60.0 | 0-15.0 | 0.001-15.0 |
| Di or tri methacrylate monomer | 0.1-10.0 | 0.1-10.0 | 0-10.0 | 0.001-10.0 |
| Fumed Silica Hydrophilic | 0-20.0 | 0.01-20.0 | 0-25.0 | 0.05-25.0 |
| Aziridene | 0-10.0 | 0.001-10.0 | 0-60.0* | 10-60.0 |
| Grafted Elastomer | 0-15.0 | 0.001-15.0 | 10.0-60.0** | 10.0-60.0 |
| Thermoplastic additive | 05-60 | 0.001-40.0 | 0.01-60.0 | 0.001-40.0 |
| Borane-amine complex | 0-5.0 | 0.005-5.0 | 5.0-50.0 | 5.0-50.0 |
| Inhibitor 5% in monomer | 0-5.0 | 0.001-5.0 | 0-5.0 | 0.001-5.0 |
| Stabilizer 10% in monomer | 0-5.0 | 0.001-5.0 | 0-5.0 | 0.001-5.0 |
| Additional inert diluents or fillers | remainder | remainder | remainder | remainder |

*Essential for 10:1 and optional for 1:1
**Essential for 1:1 and optional for 10:1

A process is provided for producing an adhesive formulation produced by free radical polymerization to bond to a low surface energy substrate. An inventive formulation that is either premixed to initiate a time period of pot life or alternatively, co-applied to a substrate under conditions for polymerization to occur between the various monomers. A pot life of less than ten minutes is provided in certain inventive embodiments to afford a rapid build to 345 kPa of less than 90 minutes and in other embodiments less than 30 minutes and 40 minutes, respectively for 1:1 a dn 10:1 ratio formulations. In specific embodiments polymerization occurs at 23° C. in ambient atmosphere while in other embodiments, polymerization is initiated by energy inputs such as heating, electromagnetic radiation, or UV radiation or free radical mechanism.

Regardless of the form of an inventive formulation, upon induction of pot life for the formulation, the formulation is present in simultaneous contact with two or more substrates for an amount of time sufficient to achieve a bond between the substrates. While an inventive formulation is particularly well suited for bonding low surface energy substrates such as polyolefins, ABS, polycarbonate, and other such polymers to one another, substrates in simultaneous contact with polymerizing inventive formulation need not be the same. Other substrates that can be joined to a low energy surface substrate illustratively includes metals, other plastics, glass, and wood. Two such substrates can be brought together to form various jointed structures such as a lap joint, butt joint, corner joint, edge joint, and T-joint. In still other embodiments, an inventive formulation is applied to a single substrate and allowed to cure to form a coating that affords substrate protection or is operative as a primer for subsequent material applications. As inventive formulations typically achieve a rapid build in strength to 345 kPa within from 15 to 40 minutes per ASTM D 1002, substrates are fixtured or otherwise held in relative desired alignment for a time period of from 5 minutes to 120 minutes. The joined substrates are then amenable to being removed from the fixture while an inventive formulation continues to cure to achieve terminal strength in between 6 and 24 hours, with 6 to 8 hours to achieve terminal strength being typical. As an inventive formulation cures through a free radical mechanism, an inventive formulation can be applied to a variety of thicknesses and still achieve cure polymerization. Typical thicknesses of an inventive formulation between substrates ranges from 0.001-4 mm.

The present invention is further described with respect to the following non-limiting examples. These examples are intended to illustrate specific formulations according to the present invention and should not be construed as a limitation as to the scope of the present invention.

EXAMPLE 1

Compounding Of Two-Part Inventive Formulation

An adhesive Part A is produced by mixing 55 grams of methacrylate and 20 grams of elastomer in a clean closed glass container that is stirred at 100 revolutions per minute (rpm) for 5 minutes. 10 grams of methacrylic acid is added to the mixture and stirred at 300 rpm until a homogenous liquid forms. 10 grams of cross linker is stirred into the homogenous liquid at 100 rpm for 5 minutes followed by the addition of 5 grams of hydrophilic fume silica and stirred at 1,000 rpm for 15 minutes to achieve a uniform consistency.

Activator Part B is produced when 60 grams of methacrylate are blended with 20 grams of elastomer/Thermoplastic additive in a clean closed glass vessel that is stirred at 100 rpm for 5 minutes. 4 grams of dihydrocarbyl hydroxyl amine, 2 grams of halogenated tallow alkyl amine, and 1 gram of TEMPO are added to the reaction mixture and stirred at 300 rpm for 5 minutes. 13 grams of triethylborane-amine complex are added into the reaction mixture and stirred at 300 rpm for 15 minutes to yield a Part B.

Part A and Part B are combined in ratios of 1:1 or 10:1 and used in subsequent testing with formulations having the characteristics per Table 2.

EXAMPLE 2

Thermal Stability Testing

1:1 System: Uncured samples are kept at 50±1° C. for 30 days and observed to change in viscosity by less than 20% relative to initial viscosity. Pot life, mechanical strength, bonding capability of low energy surfaces and development of strength for polypropylene remained within 85% relative to the initially formulated samples substrates during the test period. Further, product performance and lap shear strength are found to be within 80% even after aging the sample at 50° C. for 21 days.

10:1 System: Uncured samples were subjected to 50±1° C. for 30 days and observed to change in viscosity by less than 20% relative to initial viscosity. Pot life, mechanical strength, bonding capability of low energy surfaces and development of strength for polypropylene remained within 85% relative to the initially formulated samples substrates during the test period. Further, product performance and lap shear strength are found to be within 85% even after aging the sample at 50° C. for 30 days.

Both the systems have shown even better performance and stability when subjected to 40±1° C. A 1:1 ratio system is observed to be stable for more than 60 days and 10:1 system for more than 90 days, without having a substantive performance decrease.

EXAMPLE 3

Rate of Strength Development for Inventive Formulations Relative to Reference Sample Duplicate lap joints are formed between strips of various substrate materials with the substrate strips having a thickness of 3.02 mm and an adhesive thickness of between 0.03 mm and 0.06 mm at a temperature of 23.5° C. No prior surface preparation is performed. The coupon dimensions are 101.6 mm×25.4 mm×3.35 mm with an overlap of 25.4 mm×12.5 mm with a ramp rate of 10 mm per minute. The strips are coated with formulations of Example 1 in formulations I, II extended pot (EP) II or III per Table 2. Information is also provided in Table 2 for commercially available reference formulas denoted as Ref. Samples 1 and 2.

TABLE 2

Comparative data of the inventive formulations over conventional reference products.

| Properties | Formulation I | | Formulation II | | Formulation II EP | | Formulation III | |
|---|---|---|---|---|---|---|---|---|
| | Adh | Act | Adh | Act | Adh | Adh | Act | Act |
| Color | Yellowish | Brownish | White | Brownish | white | White | Yellowish | Yellowish |
| Viscosity cps | 22000-26000 | 25000-30000 | 28000-32000 | 25000-30000 | 26800-28800 | 17000-20000 | 24000-28000 | 32800-34800 |
| Density | 1.121 | 1.0113 | 1.0098 | 1.0113 | 0.9963 | 1.0 | 0.98 | 1.06 |
| Mix Ratio; By weight | 1:1 | | 1:1 | | 1:1 | | 10:1 | |
| Pot life; min | <4.0 | | <5.0 | | <6.0 | | <3.0 min | |
| Handling Strength (50 psi) | 30 Min | | 30 Min | | 110 Min | | 40 Min | |
| Full Cure, Hr | 6-8 | | 6-8 | | 6-8 | | 6-8 | |
| Shore Hardness; D | 65 | | 62 | | 62 | | 63 | |
| Single Lap Shear (psi) PP Substrate (Local) SF | 800-1200 | | 750-1150 | | 600-900 | | 600-900 | |
| TS Adhesive bond PP (psi) | 600-900 | | 650-950 | | 800-1100 | | 500-800 | |

TABLE 2-continued

Comparative data of the inventive formulations over conventional reference products.

| | | | | |
|---|---|---|---|---|
| TS Adhesive bond GBMS (psi) | 600-900 | 800-1200 | 800-1200 | 500-800 |
| Impact strength (Joules) | 20-30 | 25-35 | 15-25 | 14-24 |

| | Formulation IV | | Ref. Sample 1 | | Ref. Sample 1 | | Ref. Sample 3 | |
|---|---|---|---|---|---|---|---|---|
| Properties | Adh | Act | Adh | Act | Adh | Act | Adh | Act |
| Color | Off white | Brownish | White | Brownish | White | Brownish | white | Yellowish |
| Viscosity cps | 20000-30000 | 40000-50000 | 25000-30000 | 28000-32000 | 20000-30000 | 33800-43800 | 80000-120000 | 12000-22000 |
| Density | 1.121 | 1.0113 | 1.0098 | 1.0113 | 0.9963 | 1.06 | 0.9813 | 1.04 |
| Mix Ratio; By weight | 1:1 | | 10:1 | | 10:1 | | 1:1 | |
| Pot life; min | <3 | | 1.35 | | 3.0 | | 1 | |
| Handling Strength (50 psi) | 30 Min | | 45 Min | | 200 min | | 45 Min | |
| Full Cure, Hr | 6-8 | | 8-10 | | 12-24 | | 10-12 | |
| Shore Hardness; D | 61 | | 63 | | 55 | | 63 | |
| Single Lap Shear (psi) PP Substrate (Local) SF | 900-1400 | | 600-1000 | | 350-650 | | 600-900 | |
| TS Adhesive bond PP (psi) | 600-800 | | 500-800 | | 750-950 | | 500-800 | |
| TS Adhesive bond GBMS (psi) | 600-800 | | 600-800 | | 800-1200 | | 600-800 | |
| Impact strength (Joules) | 15-25 | | 15-25 | | 15-25 | | 15-25 | |

The single lap shear strength of various inventive formulations are compared to reference samples 1 and 2 on various substrates per Table 2 that are commercially available organoborane activated two-part adhesive. The room temperature strength on neat polypropylene substrates is provided in Table 3 for inventive formula II variants and Ref. Samples 1 and 2.

TABLE 3

Single Lap shear strength on polypropylene as a function of time is measured in pounds per square inch (psi).

| Time | IIC Form I | IIC Form II | Ref. Sample 1 |
|---|---|---|---|
| 0.5 hr | 50.0 | 53.0 | 38.0 |
| 1 hr | 97.0 | 253.0 | 133.0 |
| 2 hr | 335.0 | 332.0 | 296.0 |
| 3 hr | 456.0 | 292.0 | 339.0 |
| 4 hr | 447.0 | 517.0 | 519.0 |
| 5 hr | 456.0 | 533.0 | 376.0 |
| 6 hr | 584.0 | 547.0 | 498.0 |
| 24 hr | 754.0 | 764.0 | 749.0 |

The room temperature strength for inventive formula II variants and Ref. Samples 1 and 2 on grit blasted mild steel (GBMS) substrates is provided in Table 4.

TABLE 4

Single Lap shear strength on Grit blasted mild steel as a function of time is measured in pounds per square inch (psi).

| Time | IIC Form I | IIC Form II | Ref. sample 1 |
|---|---|---|---|
| 0.5 hr | 50 | 75 | 75 |
| 1 hr | 225 | 220 | 175 |
| 2 hr | 376 | 275 | 275 |
| 3 hr | 520 | 350 | 350 |
| 4 hr | 690 | 750 | 450 |
| 5 hr | 830 | 800 | 520 |
| 6 hr | 900 | 1020 | 650 |
| 24 hr | 1150 | 1224 | 850 |

The room temperature strength for inventive formula I and II variants and Ref. Samples 1 on E-coated steel substrates is provided in Table 5.

TABLE 5

Single Lap shear strength on E-coated steel as a function of time is measured in pounds per square inch (psi).

| Time | IIC Form I | IIC Form II | Ref. sample 1 |
|---|---|---|---|
| 0.5 hr | 294.0 | 247.0 | 206.0 |
| 1 hr | 369.0 | 363.0 | 315.0 |
| 3 hr | 1451.0 | 818.0 | 976.0 |

EXAMPLE 4

Adhesive Bond Age Testing

Single lap shear testing is performed according to ASTM D1002 using polypropylene substrates having a thickness of 3.02 mm and an adhesive thickness of between 0.03 mm and 0.06 mm at a temperature of 23.5° C. No prior surface preparation is performed. The coupon dimensions are 101.6 mm×25.4 mm×3.35 mm with an overlap of 25.4 mm×12.5 mm with a ramp rate of 10 mm per minute. The strength of single lap shears in psi as a function of test temperature for various formulations per Table 2 are provided in Tables 6 and 7 at 15 and 30 days, respectively with the failure mode of substrate failure noted as SF and adhesive failure noted at AF.

TABLE 6

Strength as Measured 15 Days after Bonding at Various Test Temperatures

| | Temp | | | |
|---|---|---|---|---|
| | −20.0 Deg C. | 5.0 Deg C. | 23.0 Deg C. | 100 Deg C. |
| IIC Form I | 750 SF | 750 SF | 745 SF | 750 SF |
| IIC Form II | 765 SF | 760 SF | 765 SF | 760 SF |
| IIC Form II EP | 745 SF | 760 SF | 750 SF | 550 SF |
| Ref Sample 1 | 220 AF | 250 AF | 750 SF | 750 SF |

TABLE 7

Strength as Measured 30 Days after Bonding at Various Test Temperatures

| | Temp | | | |
|---|---|---|---|---|
| | −20 Deg C. | 5.0 Deg C. | 23.0 Deg C. | 100 Deg C. |
| Form I | 436 | 486 | 493 | 760 |
| Form II | 750 | 750 | 760 | 765 |
| Form II EP | 740 | 625 | 690 | 760 |
| Ref. sample 1 | 278 | 432 | 538 | 616 |

Patents and references cited in the application are indicative of the skill in the art. Each of these patents and references is hereby incorporated by reference to the same extent as if each reference was individually incorporated by reference.

The invention claimed is:

1. A two part adhesive formulation comprising:
an adhesive part comprising:
free-radical curable monomers, each of said free-radical curable monomers containing at least one acrylate moiety or at least one methacrylate moiety;
a chlorosulfonated polymer;
an elastomer;
a Lewis acid;
a polyfunctional monomer of dimethacrylate monomer, trimethacrylate monomer, or a combination thereof; and
an activator part present in a 1:1 weight ratio of said adhesive part: said activator part, said activator part comprising:
an activator of borane-amine complex comprising a trialkyl borane, an alkyl cycloalkyl borane, or a combination thereof; and
a grafted elastomer with a thermoplastic additive.

2. The formulation of claim 1 further comprising an aziridine, a polyaziridine, or a combination thereof present in at least one of said adhesive part or said activator part.

3. The formulation of claim 1 wherein said free-radical curable monomer amount constitutes the majority by weight of the total formulation.

4. The formulation of claim 1 wherein said polyfunctional monomer and said acrylate monomers are present in a molar ratio of 0.001-0.5:1.

5. The formulation of claim 1 wherein said chlorosulfonated polymer comprises chlorosulfonated polyethylene, chlorosulfonated polypropylene, or a combination thereof.

6. The formulation of claim 1 wherein said Lewis acid is a carboxylic acid.

7. The formulation of claim 1 further comprising at least one of said free-radical curable monomers, said chlorosulfonated polymer, said Lewis acid, said dimethylacrylate monomer or said trimethylacrylate monomer is present in said activator part.

8. The formulation of claim 1 further comprising a stabilizer in at least one of said adhesive part or said activator part.

9. The formulation of claim 1 further comprising a filler in at least one of said adhesive part or said activator part.

10. The formulation of claim 9 wherein said filler is fumed hydrophilic silica.

11. The formulation of claim 1 further comprising at least one of an antioxidant, polymerization inhibitor, dye, thixotrope, glass microspheres, or a combination thereof in at least one of said adhesive part or said activator part.

12. The formulation of claim 1 further comprising halogenated tallow alkyl amines in at least one of said adhesive part or said activator part.

13. A two part adhesive formulation comprising:
an adhesive part comprising:
one or more free-radical curable monomers, each of said one or more free-radical curable monomers containing at least one acrylate moiety or at least one methacrylate moiety;
a chlorosulfonated polymer;
a Lewis acid;
a polyfunctional monomer of dimethacrylate monomer, trimethacrylate monomer, or a combination thereof; and
an activator part present in a 10:1 weight ratio of said adhesive part: said activator part, said activator part comprising:
a borane-amine complex comprising a trialkyl borane, an alkyl cycloalkyl borane, or a combination thereof; and
at least one of an aziridine or a polyaziridine.

14. The formulation of claim 13 further comprising a grafted elastomer present in at least one of said adhesive part or said activator part.

15. A process of applying an adhesive to a substrate comprising:
mixing together said adhesive part and said activator part of claim 1 to form a mixture wherein each of said adhesive part and said activator part has storage stability at 50° C. for 30 days such that viscosity at 30 days is within 40% of an initial viscosity of said adhesive part or said activator part;

applying said mixture to said substrate; and allowing said mixture to cure to achieve an initial strength of at least 345 kiloPascals (kPa) within 30 minutes for the 1:1 weight ratio and 40 minutes for the 10:1 weight ratio.

16. The process of claim 15 wherein the 1:1 weight ratio and the 10:1 weight ratio are each within ±10% of 1:1 or 10:1.

17. The process of claim 15 wherein the substrate is a low-energy substrate and said mixture cures thereon to form an exposed coating.

18. The process of claim 15 further comprising contacting a second substrate with said mixture during cure to create a bond between the substrate and the second substrate.

19. The process of claim 18 further comprising fixturing the substrate and the second substrate in a joint position and in simultaneous contact with said mixture for a period of time between 2 and 120 minutes during the free-radical cure and then releasing the substrate and the second substrate from the fixture.

20. The process of claim 15 wherein the substrate is one of a polyolefin, acrylonitrile-butadiene-styrene, polycarbonate, polybutylene terephthalate, e-coated steel, grit blasted mild steel, or glass.

* * * * *